United States Patent Office 3,528,467
Patented Sept. 15, 1970

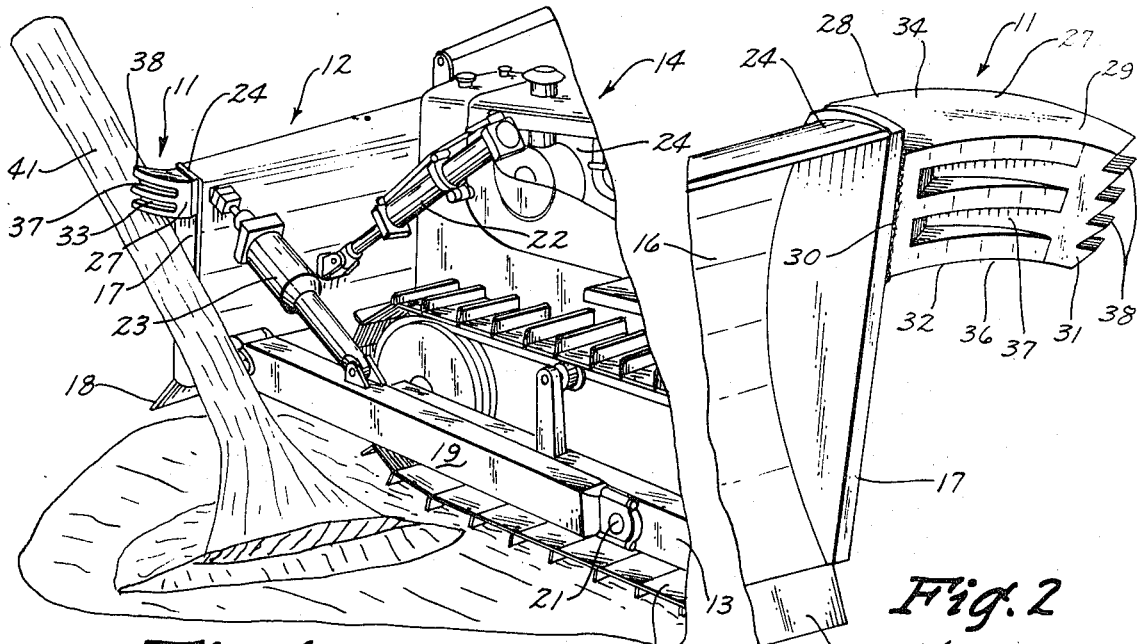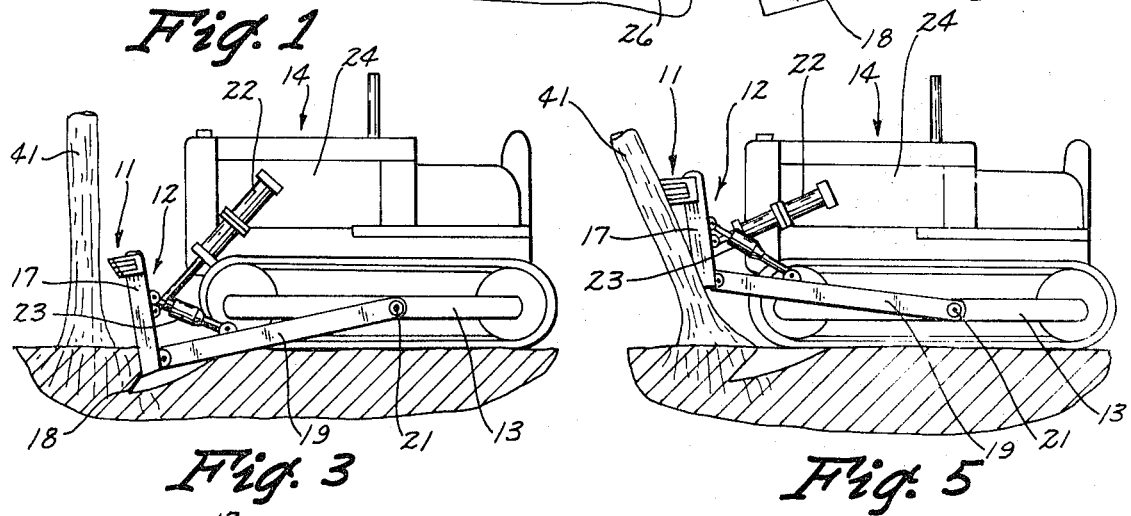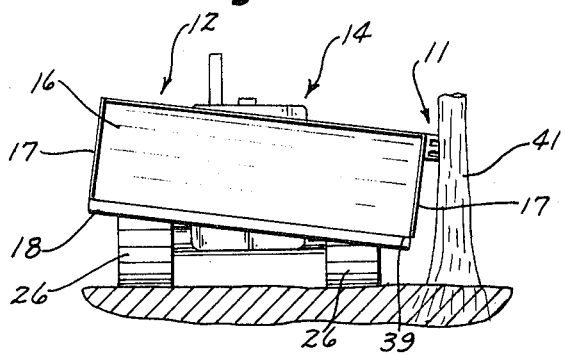

3,528,467
TREE PUSHING ATTACHMENT FOR A TRACTOR BULLDOZER BLADE
Harry E. Watsabaugh, Humeston, Iowa 50123
Filed Mar. 18, 1968, Ser. No. 713,720
Int. Cl. A01g 23/02
U.S. Cl. 144—34       3 Claims

ABSTRACT OF THE DISCLOSURE

The invention provides a tree pushing attachment adapted to be directly mounted to a bulldozer blade that is pivotally and tiltably carried at the front end of a tractor. The tree pushing attachment comprises a body member having a base portion at one end that is welded to the upper end of an upright plate extended transversely of the blade at one end thereof. The attachment is thus movable with the blade which is pivotally and tiltably connected to the frame unit of the tractor and extends across the front end thereof. The body member is of an arcuate shape longitudinally thereof so that with the base portion secured to the upright plate, the other end thereof provides a tree engaging portion that is positioned outwardly from the end plate and projects forwardly from the blade. The front surface of the tree engaging portion is formed with a series of vertically spaced teeth which engage the tree to be uprooted. The roots to one side of the tree are initially cut by the lower edge of the blade, after which such one side of the tree is engaged by the tree engaging portion of the body member, when the blade is in a raised position, and then uprooted on a forward advance of the tractor in a path parallel to the tree.

SUMMARY OF THE INVENTION

The tree pushing attachment of this invention provides for a simple, inexpensive and compact structure adapted to be secured to a bulldozer blade on a tractor to facilitate the clearing of trees from the land. The attachment is rigidly connected adjacent an upper corner of the dozer blade so as not to interfere with the normal function of the blade. With the blade moved to its fully raised position and tilted transversely of the tractor, so that the attachment is at the downward end of he blade, the attachment is moved on advance of the tractor to apply a horizontal force against a tree to be uprooted or dislodged. The tree engaging portion of the attachment is offset from the line of travel of the tractor which provides for the tree being engaged and forced to the ground by the attachment while permitting the tractor to travel along side of the tree. When large size trees are to be uprooted the bulldozer blade may be initially used to sever the roots at that side of the tree which is to be engaged by the attachment.

DETAILED DESCRIPTION OF THE INVENTION

Further objects, features and advantages of the invention will become apparent from the following description when taken in connection with the accompanying drawings wherein:

FIG. 1 is a partial perspective view of a tractor having a bulldozer blade showing the tree pushing attachment of this invention in assembly relation with the bulldozer blade;

FIG. 2 is an enlarged detail perspective view showing the assembly of the tree pushing attachment with the bulldozer blade;

FIG. 3 is a diagrammatic side elevational view of the assembly of FIG. 1 showing the dozer blade in a position to sever the tree roots adjacent one side of a tree to be dislodged;

FIG. 4 is a diagrammatic front elevational view of the assembly in FIG. 3 showing the offset relation of the tractor with the tree being uprooted.

FIG. 5 is a side elevational view illustrated similarly to FIG. 3 with the tree pushing attachment shown in engagement with a tree that is partially dislodged;

Referring to the drawings, the tree pushing attachment of this invention, indicated generally at 11 in FIG. 1, is shown in operational assembly with a bulldozer blade assembly 12 pivotally and tiltably carried on the main frame 13 of a tractor 14. The blade unit 12, includes an upright arcuately curved blade member 16 having a concave front surface with upright transversely extended plate members 17 secured to each end thereof. A cutting blade or edge 18 is provided at the lower side of the blade member 16. The blade unit 12 is pivotally mounted at the forward ends of a pair of lift arms 19 located at opposite sides of the main frame with their rear ends pivotally supported at 21 on the main frame 13. Pivotal up and down movement of the lift arms 19 to raise and lower the blade unit 12 is accomplished through the operation of a pair of hydraulic lift cylinders 22 spaced transversely of the main frame 13 and interconnected with the blade member 16 and the frame 13. Tiltable movement of the blade unit 12 transversely of the tractor 14 is accomplished through the operation of a single hydraulic tilt cylinder 23 connected to one of the lift arms 19 and to the upper corner 24 of the blade unit 12. The tractor 14 and its assembly with the blade unit 12 are of a well known construction. The tractor includes an engine 24, endless tracks 26 and an oil pump unit (not shown) for supplying oil under pressure to the hydraulic cylinders 22 and 23.

The tree pushing attachment 11 of this invention is comprised of a body member 27 of a solid cast metal construction having at one end a base section 28 and at its opposite end a tree engaging section 29 (FIG. 2). The body member 27 is longitudinally curved from the base section 28 to the tree engaging section 29 so that the terminal surface 31 of the section 29 lies in a plane substantially normal to the terminal surface of the base section 28. As a result when the terminal surface of the base section is secured to the upper end of the outer surface of an upright plate member 17, the body member 27 may be arranged to project outwardly from the plate member 17 with the terminal surface 31 of the tree engaging section 29 facing frontward at a position forwardly of the blade member 16. The body member 27 may be secured to a plate member 17, by a weldment 30 or like means.

As clearly appears in FIGS. 1 and 2, the body member 27 is of a progressively decreasing width from the terminal surface of the base section 28 to the terminal surface 31 with its front and back sides 32 and 33, respectively, being curved and its top and bottom sides 34 and 36, also respectively, being flat. The front side 32 and rear side 33 are formed with grooves 37 for the purpose of reducing the weight of the body member 27. The surface 31, of the tree engaging section 29 is formed with a series of vertically spaced forwardly extended teeth 38 for engaging a tree to be uprooted. With reference to FIGS. 2 and 4, it is seen that the surface 31, and in turn the edges of the teeth 38, lie in a plane inclined downwardly and rearwardly relative to the forward end of the top side 34 of the body member 27.

It is seen, therefore, that the body member 27 is pivotally and tiltably movable with the blade 16 and is mounted thereon so as not to interfere with the normal use of the blade 16 for bulldozing operations.

When a tree is to be uprooted, the blade 17 is lowered and then tilted so that on manipulation of the tractor the lowermost end portion 39 of the blade may be used to sever the roots adjacent one side of a tree 41 as shown in FIG. 3. When such roots have been severed the blade unit 12 is pivotally moved to its highest raised position, as shown in FIG. 4, so that the attachment 11 is at the lowered end of the blade member 16. The tractor 14 is then manipulated to engage the side of the tree 41, at which the roots have been severed, while in a position such, that when forwardly advanced, the tractor will move in a path along side of the tree, as shown in FIG. 4.

By virtue of the attachment being projected laterally outwardly from the blade member 17, adequate clearance is provided between the blade member and the tree 41, and in turn between the tree and the tractor 14. The tilting of the blade member to locate the attachment 11 at the lowered end thereof assures adequate clearance between the blade and the base of the tree 41, since the tree base is usually of a greater diameter than the tree trunk. It is to be noted also that the higher the position at which the attachment 11 engages the tree, the greater will be the leverage action of the pushing force applied to the tree by the forward advance of the tractor 14.

On initial engagement of the body member 27 with the tree 41, and as is apparent in FIG. 3, the upper ones of the teeth 38 will make first contact with the tree. As the tree is being pushed over, and as shown in FIG. 5, the remaining teeth will progressively move into engagement with the tree, so that one of more teeth will be engaged with the tree during the entire tree uprooting operation. Since the tractor 14 is freely movable along side of the tree it is capable of being advanced until the tree is completely uprooted. It is to be noted that a similar result would be obtained if the teeth 38 were eliminated and only a downwardly inclined flat surface 31 on the body member 27 was used.

Although the invention has been described with respect to a preferred embodiment thereof it is to be understood that it is not to be so limited since changes can be made therein which are within the full intended scope of this invention as defined in the appended claims.

I claim:

1. A tree pushing attachment for a tractor having a front end bulldozer blade unit comprising:
   (a) a body member having a base portion at one end and a forwardly extended portion at the other end thereof,
   (b) said forwardly extended portion having a front surface movable into bearing engagement with the outer surface of a tree, and
   (c) means for rigidly securing said base portion to one end of said blade unit at the upper side thereof, whereby said body member is extended outwardly from the blade with said front surface located forwardly of said blade in an upright plane extended transversely of the tractor.

2. A tree pushing attachment for a tractor having a front end bulldozer blade unit comprising:
   (a) a body member having a base portion at one end and a forwardly extended portion at the other end thereof,
   (b) said forwardly extended portion having a front surface engageable with a tree, and
   (c) means for rigidly securing said base portion to one end of said blade unit at the upper side thereof, whereby said body member is extended outwardly from the blade with said front surface located forwardly of said blade and
   inclined downwardly and rearwardly.

3. A tree pushing attachment for a tractor having a front end bulldozer blade unit as defined in claim 2, wherein:
   (a) said front surface is formed with a series of vertically spaced forwardly projected teeth.

References Cited

UNITED STATES PATENTS

| | | | |
|---|---|---|---|
| 2,187,707 | 1/1940 | Kane | 144—34 |
| 2,295,458 | 9/1942 | Edwards | 144—34 |
| 2,965,989 | 12/1960 | Hibbard | 144—34 |

GERALD A. DOST, Primary Examiner